Jan. 16, 1962 W. ABEL 3,017,085
COUNTING MECHANISM
Filed March 25, 1955

Inventor
Walter Abel
By
Attorneys.

3,017,085
COUNTING MECHANISM
Walter Abel, Salford, England, assignor to Measure-Meters Co. Limited, Radcliffe, England, a corporation of Great Britain
Filed Mar. 25, 1955, Ser. No. 496,845
2 Claims. (Cl. 235—117)

This invention relates to the counting mechanism of length measuring apparatus of fabric or other material of the kind in which the material is drawn between measuring rollers, the rotation of one of which drives a counting mechanism which comprises a series of discs or wheels on the peripheries of which are inscribed numbers, the first wheel indicating units, the second wheel tens, and the third wheel hundreds and so on, or in some cases the first wheel may indicate fractions, the second wheel units, the third tens and so on.

When such apparatus is employed on the counters of retail establishments the numbers on the discs are only visible to the assistant or to the customer according to the position in which the apparatus is mounted, and the object of the present invention is an arrangement in which the indicators are duplicated so that one series of figures is visible to the assistant and the other series is visible to the customer, who is usually at the opposite side of the counter.

According to the present invention the counting mechanism comprises the usual series of wheels or discs rotated from the measuring rollers, the first wheel being directly driven through gearing, the second wheel being driven from the first wheel when the latter has made one revolution and the third wheel being driven from the second wheel when the second wheel has made one revolution and a second series of discs or wheels, on the peripheries of which the numerals indicating the length measured are inscribed driven through gears on a lay shaft from the first (i.e. the usual) series of wheels and this second series of wheels is divided into two sets, on one set the numerals being inscribed so that they will be correctly seen from the front of the device and on the other so that they will be correctly seen from the rear thereof and as both sets of wheels rotate in the same direction the numerals on one set are reversed in relation to the numerals on the other set since at the viewing point of one set the numerals will appear to be moving downwards and at the viewing point of the other set they will appear to be moving upwards.

The invention is illustrated in and will be described with reference to the accompanying drawings, in which.

Figure 3:
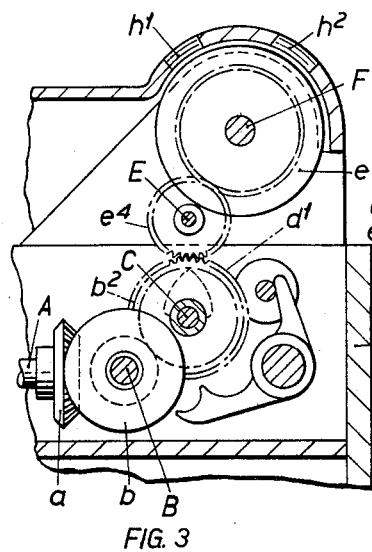
FIG. 3 is a section on line 3—3 of FIG. 1 but showing the casing in position.
Figure 1:
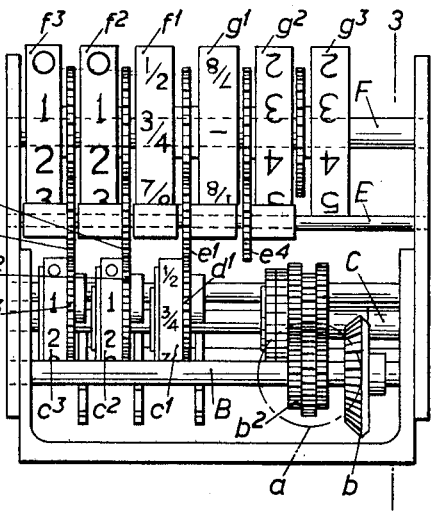
FIG. 1 is a front elevation of the mechanism with the casing removed.
Figure 2:
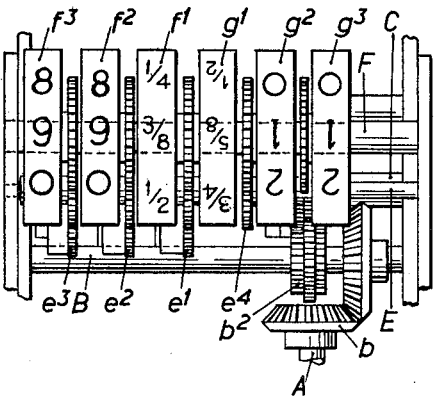
FIG. 2 is a plan of FIG. 1.
Figure 4:
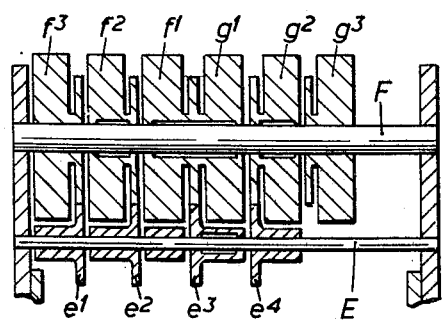
FIG. 4 is a section through the axes of the shaft on which the two sets of wheels or discs are mounted, and the intermediate lay shaft.

In the mechanism shown in the drawings the usual counting mechanism consists of three counting wheels or discs $c^1$, $c^2$, $c^3$ operated in the usual way from the input shaft A which is driven from the measuring roller through the bevel wheels $a$ and $b$, the shaft B and the train of gearing $b^2$, the wheels or discs being mounted on the shaft C. The mechanism is also provided with the usual zeorising mechanism. Further the unit counting wheel $c^1$ is graduated in fractions, i.e. $\frac{1}{8}$, $\frac{1}{4}$, $\frac{3}{8}$–$\frac{7}{8}$.

Each wheel or disc $c^1$, $c^2$, $c^3$ is formed with or has secured thereto a gear wheel $d^1$, $d^2$, $d^3$, which gears with a corresponding wheel $e^1$, $e^2$, $e^3$ on an intermediate lay shaft E.

Two duplicate sets of wheels or discs $f^1$, $f^2$, $f^3$ and $g^1$, $g^2$, $g^3$ which are viewed by the assistant and the customer respectively are mounted on a shaft F parallel to the shafts E and C. Each set of wheels or discs $f^1$, $f^2$, and $f^3$ and $g^1$, $g^2$ and $g^3$ is inscribed with the same numbers as the wheels or discs $c^1$, $c^2$ and $c^3$ but the markings on the wheels $g^1$, $g^2$ and $g^3$ are reversed in relation to those on the wheels $f^1$, $f^2$, $f^3$.

The whole mechanism is enclosed in a casing H provided with two apertures $h^1$ and $h^2$ (see FIG. 3) through one of which the wheels $f^1$, $f^2$ and $f^3$ can be viewed from the front of the mechanism and through the other of which the wheels $g^1$, $g^2$ and $g^3$ can be viewed from the back of the mechanism.

The first wheels $f^1$ and $g^1$ of each set are secured together so as to rotate in unison and are loosely mounted on the shaft and are driven from the first wheel $c^1$ of the usual mechanism through the gear wheel $e^1$ loosely mounted on the lay shaft E. The second wheels $f^2$ and $g^2$ of each set are driven from the second wheel $c^2$ of the ordinary mechanism through the gear wheels $e^2$ and a gear wheel $e^4$ affixed on the lay shaft E. The wheel $e^2$ gears with the wheel $c^2$ of the ordinary mechanism and the wheel $f^2$ of one of the duplicate sets and the wheel $e^4$ gears with the wheel $g^2$ of the other duplicate set.

The third wheel $f^3$ of the duplicate set $f^1$, $f^2$, $f^3$ is fixed on the shaft F and is driven from the third wheel $c^3$ of the usual mechanism through the gear wheel $e^3$ loosely mounted on the lay shaft E. The third wheel $g^3$ of the duplicate set $g^1$, $g^2$, $g^3$ is also affixed on the shaft F so that the two wheels $f^3$ and $g^3$ rotate in unison. The wheels $f^1$, $f^2$, and $g^1$, $g^2$ are mounted so as to rotate freely on the shaft F.

Although in the device shown in the drawings which is intended for use in measuring relatively short lengths of material, the first wheel $f^1$ or $g^1$ of each set is inscribed with fractions of a unit of length, i.e. from $\frac{1}{8}$ to $\frac{7}{8}$, the second wheel with units and the third wheel with tens it is to be understood that the device is not limited to such markings.

The counting wheels $f^1$, $f^2$, $f^3$ and $g^1$, $g^2$, $g^3$ may be of a transparent or translucent material.

The measuring roller or rollers of the device may be formed of a core of resilient material surrounded by a thin sleeve of metal or a plastic, as it is found that such an arrangement gives a more accurate measurement since it prevents slipping of the material as it is drawn between the rollers.

In one such construction the centre may be formed from a tightly coiled strip of sponge or inflated rubber surrounded by a thin sleeve of springy material such as spring steel or a plastic. The sleeve may be formed with a series of apertures through which the rubber will tend to protrude.

I claim:

1. Counting mechanism for length measuring apparatus having measuring rollers between which passes material to be measured, comprising a first shaft having a set of counting wheels mounted thereon and driven from said measuring rollers, a second shaft parallel to said first shaft and on which a coaxial series of indicating wheels is mounted, said series of indicating wheels being divided into two groups and the numerals of said groups being relatively reversed and visible in upright position from opposite sides of the apparatus, and each indicating wheel of one group having a corresponding reverse indicating wheel in the other group, means fixedly mounting a first corresponding pair of said indicating wheels, one from each group, on said second shaft, means for mounting the other indicating wheels rotatably on said second shaft, a second corresponding pair of said rotatably mounted indicating wheels, one from each group, being directly secured for rotation together, gearing for driving said second corresponding pair of indicator wheels from one of said counting wheels, further gearing driving said second shaft from another of said counting wheels for simultaneously driving said first corresponding pair of indicator wheels, an intermediate lay shaft mounted parallel to said first and second shafts, a pair of gears fixed on said lay shaft, a gear rotatable with a third of said counter wheels meshed with one of said pair of lay shaft gears, and gears secured to rotate with a third corresponding pair of indicating wheels, one from each group, each meshed with one of said pair of lay shaft gears, so that said third counter wheel positively drives both of said third pair of corresponding indicating wheels simultaneously.

2. In the counting mechanism defined in claim 1, said gearing for driving both said first and second pairs of corresponding indicating wheels comprising idler gears respectively mounted on the lay shaft.

References Cited in the file of this patent

UNITED STATES PATENTS

| | | |
|---|---|---|
| 728,333 | Thompson | May 19, 1903 |
| 1,096,996 | Briare | May 19, 1914 |
| 1,169,424 | Ohmer et al. | Jan. 25, 1916 |
| 1,688,539 | Fischer | Oct. 23, 1928 |
| 2,095,329 | Hazard | Oct. 12, 1937 |
| 2,264,557 | Slye | Dec. 2, 1941 |
| 2,468,334 | Kennedy | Apr. 26, 1949 |
| 2,527,661 | Stack | Oct. 31, 1950 |
| 2,645,425 | Bliss | July 14, 1953 |